(12) United States Patent
Kang et al.

(10) Patent No.: US 9,130,946 B2
(45) Date of Patent: Sep. 8, 2015

(54) DISPLAY APPARATUS AND METHOD OF EXECUTING AND INSTALLING APPLICATION THEREOF

(71) Applicant: LG ELECTRONICS INC., Seoul (KR)

(72) Inventors: Sangwoo Kang, Seoul (KR); Jongin Shin, Seoul (KR); Heekwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 13/867,511

(22) Filed: Apr. 22, 2013

(65) Prior Publication Data
US 2013/0304795 A1 Nov. 14, 2013

(30) Foreign Application Priority Data

May 9, 2012 (KR) .................. 10-2012-0049346

(51) Int. Cl.
*G06F 15/16* (2006.01)
*H04L 29/08* (2006.01)
*G06F 9/445* (2006.01)
*G06F 9/44* (2006.01)
*H04N 21/41* (2011.01)
*H04N 21/4363* (2011.01)
*H04N 21/478* (2011.01)

(52) U.S. Cl.
CPC *H04L 67/10* (2013.01); *G06F 8/61* (2013.01); *G06F 9/4411* (2013.01); *H04N 21/4126* (2013.01); *H04N 21/43637* (2013.01); *H04N 21/4781* (2013.01)

(58) Field of Classification Search
None
See application file for complete search history.

(56) References Cited

U.S. PATENT DOCUMENTS

| | | |
|---|---|---|
| 2002/0065939 A1 | 5/2002 | Liu |
| 2002/0073411 A1 | 6/2002 | Tsunedomi et al. |
| 2006/0073785 A1* | 4/2006 | Klassen et al. ............... 455/3.01 |
| 2006/0258375 A1* | 11/2006 | Wilbrink et al. ........... 455/456.3 |
| 2008/0005764 A1* | 1/2008 | Arling et al. ..................... 725/39 |
| 2008/0120668 A1* | 5/2008 | Yau ................ 725/110 |
| 2008/0160983 A1* | 7/2008 | Poplett et al. ................ 455/419 |
| 2008/0242284 A1* | 10/2008 | Vechey et al. ................ 455/415 |
| 2009/0113080 A1* | 4/2009 | Sperling ......................... 710/14 |
| 2009/0113481 A1* | 4/2009 | Friedman ....................... 725/46 |

FOREIGN PATENT DOCUMENTS

WO WO 00/62163 A1 10/2000

OTHER PUBLICATIONS

"Turn Your TV on to a Galaxy of Remote Possibilities," Samsung; Dec. 23, 2011; accessed <http://www.samsung.com/latin_en/article/turn-your-tv-on-to-a-galaxy-of-remote-possibilities>.*

* cited by examiner

*Primary Examiner* — Thomas Dailey
(74) *Attorney, Agent, or Firm* — Birch, Stewart, Kolasch & Birch, LLP

(57) ABSTRACT

A display apparatus and a method for executing and installing an application thereof are provided. The method of executing an application of a display apparatus includes: executing a first application; displaying a list of external devices able to execute a second application included in the first application, on a screen of the display apparatus; and transmitting the second application to an external device selected from the list of eternal devices, wherein the first application is downloaded from a server to the display apparatus.

18 Claims, 11 Drawing Sheets

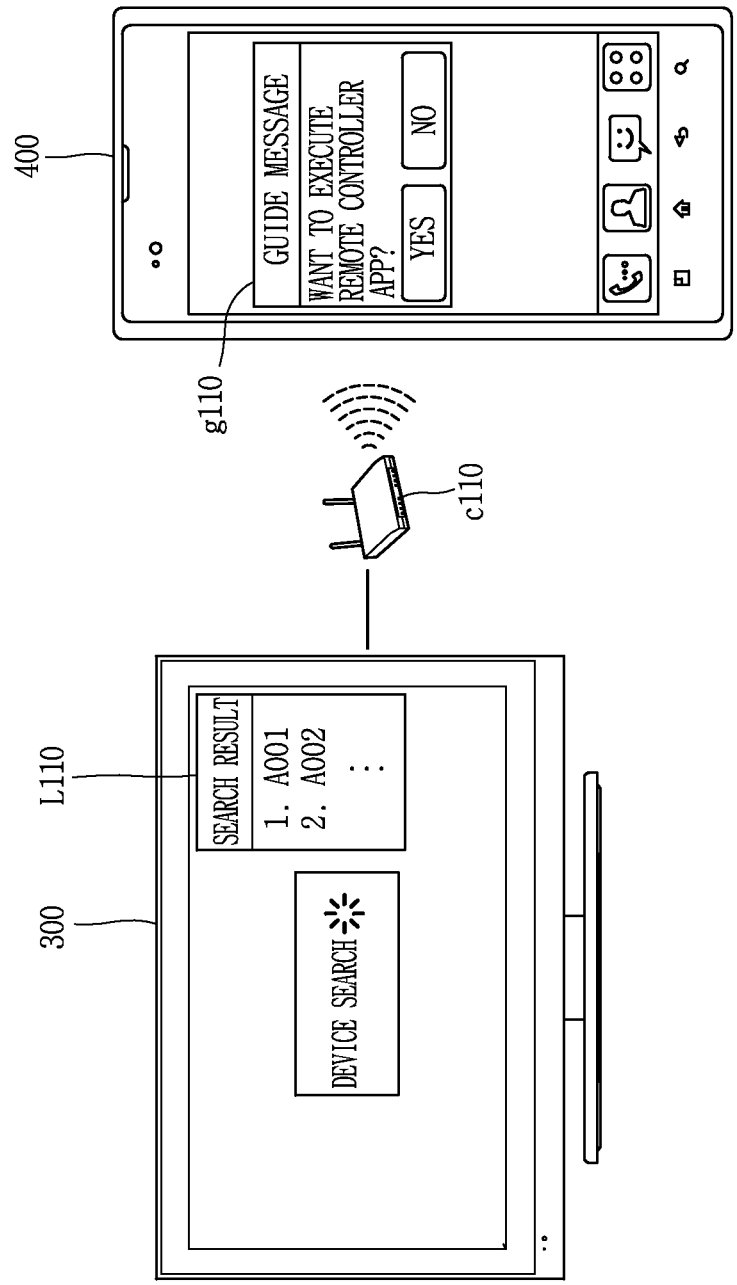

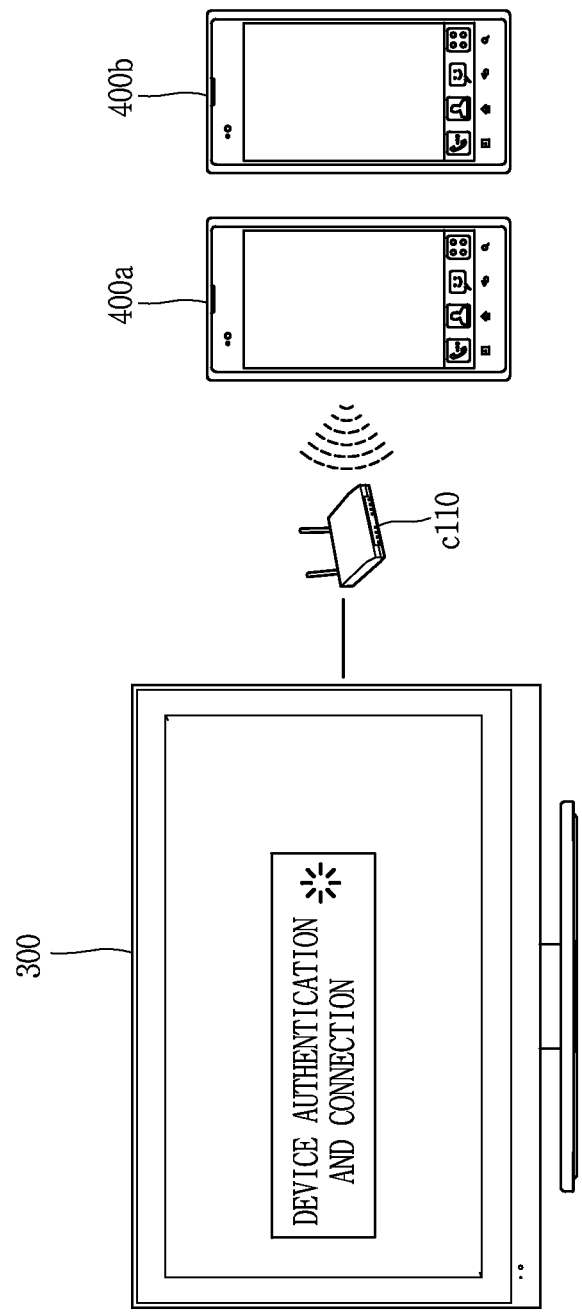

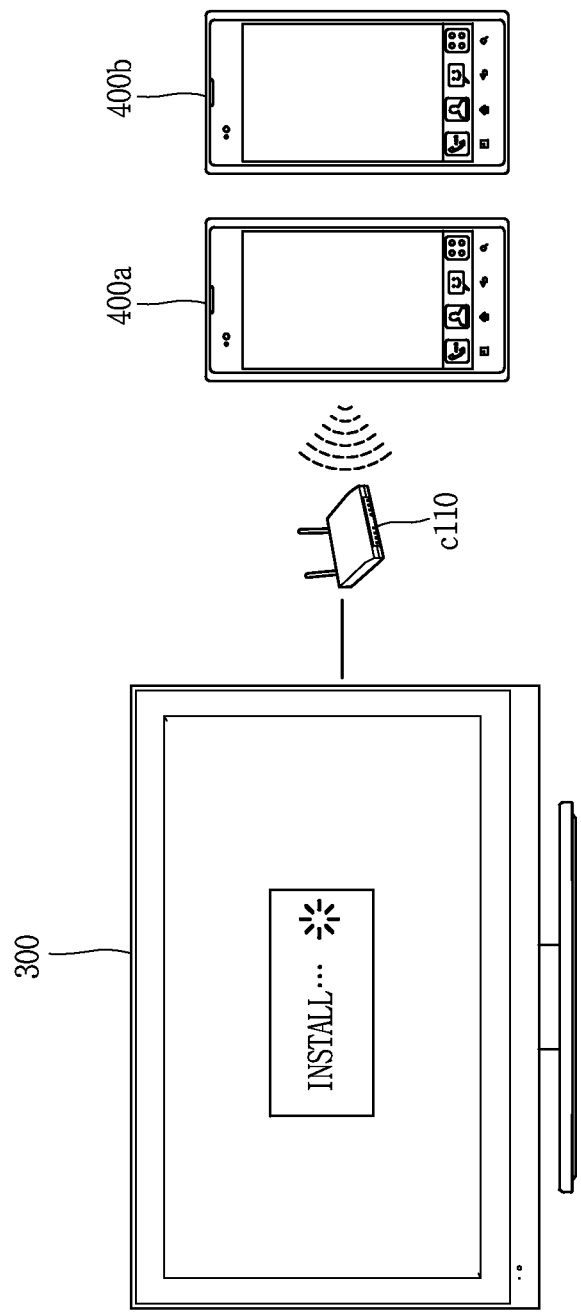

DISPLAY APPARATUS AND METHOD OF EXECUTING AND INSTALLING APPLICATION THEREOF

The present disclosure relates to subject matter contained in priority Korean Application No. 10-2012-0049346, filed on May 9, 2012, which is herein expressly incorporated by reference in its entirety.

FIELD OF THE INVENTION

The present invention relates to a display apparatus and a method for executing and installing an application thereof.

DESCRIPTION OF THE RELATED ART

Recently, smart phones and smart TVs (or digital televisions) have been strongly recognized and extensively used, downloading and installation of applications using application stores (or App stores) has been on the rise.

In order to download applications to a terminal such as a portable phone, or the like, in general, applications are installed in personal computers (PCs).

Recently, a smart phone TV or smart phone itself may access a server in relation to an application store by using a wireless communication network (e.g., Wi-Fi) to download various applications.

However, when particular multimedia contents (e.g., a game) is executed through interworking between a smart TV and a smart phone, the user should download a TV application corresponding to the smart TV and a mobile application corresponding to the smart phone from different servers, separately, and install and execute them, causing user inconvenience.

SUMMARY OF THE INVENTION

An aspect of the present invention provides a display apparatus for downloading an application including a mobile Web application from a server and transmitting the mobile Web application to a different mobile device to allow the mobile Web application to be installed and executed in the mobile device, in executing particular digital contents through an inter-device interworking function, and a method of executing and installing an application.

According to an aspect of the present invention, there is provided a method of executing an application of a display apparatus, including: executing a first application; displaying a list of external devices able to execute a second application included in the first application, on a screen of the display apparatus; and transmitting the second application to an external device selected from the list of eternal devices, wherein the first application is downloaded from the server to the display apparatus.

In an example in relation to the present disclosure, the first application may be an application in relation to a digital television, and the second application may be an application in relation to a mobile device.

In an example in relation to the present disclosure, the displaying of the list of the external devices on the screen of the display apparatus may include: searching for external devices for executing the second application included in the first application; making a list of information regarding the searched external devices to generate a list of the external devices; and displaying the list of the eternal device on the screen of the display apparatus.

In an example in relation to the present disclosure, the second application may be a Web application, and the selected external device may include a platform application able to drive a Web application.

In an example in relation to the present disclosure, the selected external device may install the second application in the platform application.

In an example in relation to the present disclosure, the selected external device may display an indicator indicating an installation process of the second application on a screen thereof.

In an example in relation to the present disclosure, the display apparatus may be a digital television, and the platform application may be a remote controller application performing a function of a remote controller with respect to the digital television.

In an example in relation to the present disclosure, the transmitting of the second application may include: determining whether or not the platform application has been executed; and transmitting the second application to the selected external device when the platform application has been executed, and transmitting a control signal such that guide information in relation to execution of the platform application is provided by the selected external device when the platform application has not been executed.

In an example in relation to the present disclosure, the guide information may be a pop-up menu displayed on the screen of the selected external device and checking whether or not the platform application has been executed, and the selected external device may execute the platform application based on a user selected input corresponding to the pop-up menu.

In an example in relation to the present disclosure, the selected external device may be a plurality of external devices, and the transmitting of the second application may include: authenticating the respective selected external devices for a connection with the plurality of selected external devices; assigning an authentication number to the authentication-completed external devices; and transmitting the second application to the authentication-completed external devices according to the assigned authentication numbers.

In an example in relation to the present disclosure, the server may provide a user interface supporting downloading of the first application to the display apparatus, the display apparatus may display a screen in relation to the UI, and an indicator indicating information that the first application includes the second application on the screen in relation to the UI.

In an example in relation to the present disclosure, the display apparatus may display an indicator indicating information that the first application includes the second application, on the screen.

In an example in relation to the present disclosure, the display apparatus may display an icon in relation to execution of the first application on the screen, and display the indicator on the icon.

According to another aspect of the present invention, there is provided a method for installing an application of a device including a platform application able to drive a Web application, including: connecting the device to a display apparatus in which a first application is executed through a fixed line or wirelessly; receiving a second application included in the first application from the display apparatus; and installing the second application in the platform application, wherein the first application and the second application may be Web applications and the first application may be downloaded from a server to the display apparatus.

According to another aspect of the present invention, there is provided a display apparatus for executing an application, including: a display unit configured to display an image in relation to a first application on a screen; a communication unit configured to transmit and receive data in relation to the first application; and a controller configured to execute the first application, control the display unit to display a list of external devices able to execute a second application included in the first application on the screen, and control the communication unit to transmit the second application to an external device selected from the list of the external devices, wherein the first application is downloaded from a server.

In an example in relation to the present disclosure, the second application may be a Web application, and the selected external device may have a platform application able to drive the Web application.

In an example in relation to the present disclosure, the controller may determine whether or not the platform application has been executed, and when the platform application has been executed, the controller may transmit the second application to the selected external device, and when the platform application has not been executed, the controller may transmit a control signal such that guide information in relation to execution of the platform application is provided by the selected external device.

In an example in relation to the present disclosure, the controller may control the display unit to display information in relation to the first application on the screen.

In an example in relation to the present disclosure, the information in relation to the first application may be information indicating that the first application includes the second application.

In an example in relation to the present disclosure, the controller may display an icon in relation to execution of the first application on the screen, and may control the display unit to display an indicator indicating information that the first application includes the second application on the icon displayed on the screen.

According to embodiments disclosed in the present disclosure, the display apparatus and the method for executing and installing an application are provided.

In particular, according to the display apparatus and the method for executing and installing an application disclosed in the present disclosure, in executing particular digital contents through inter-device interworking function, one application including a mobile Web application is downloaded from a server and the mobile Web application is transmitted to a different mobile device so that the mobile Web application can be installed and executed in the mobile device. Thus, an application developer can produce a single application without being dependent upon a mobile platform type and provide an inter-device interworking function.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A is an exemplary view illustrating a process of searching an external device by the display apparatus according to a first embodiment of the present disclosure.

FIG. 6B is an exemplary view illustrating an operation of connecting an external device according to a first embodiment of the present disclosure.

FIG. 6C is an exemplary view illustrating an operation of installing an application according to the first embodiment of the present disclosure.

DETAILED DESCRIPTION OF THE INVENTION

Figure 1:
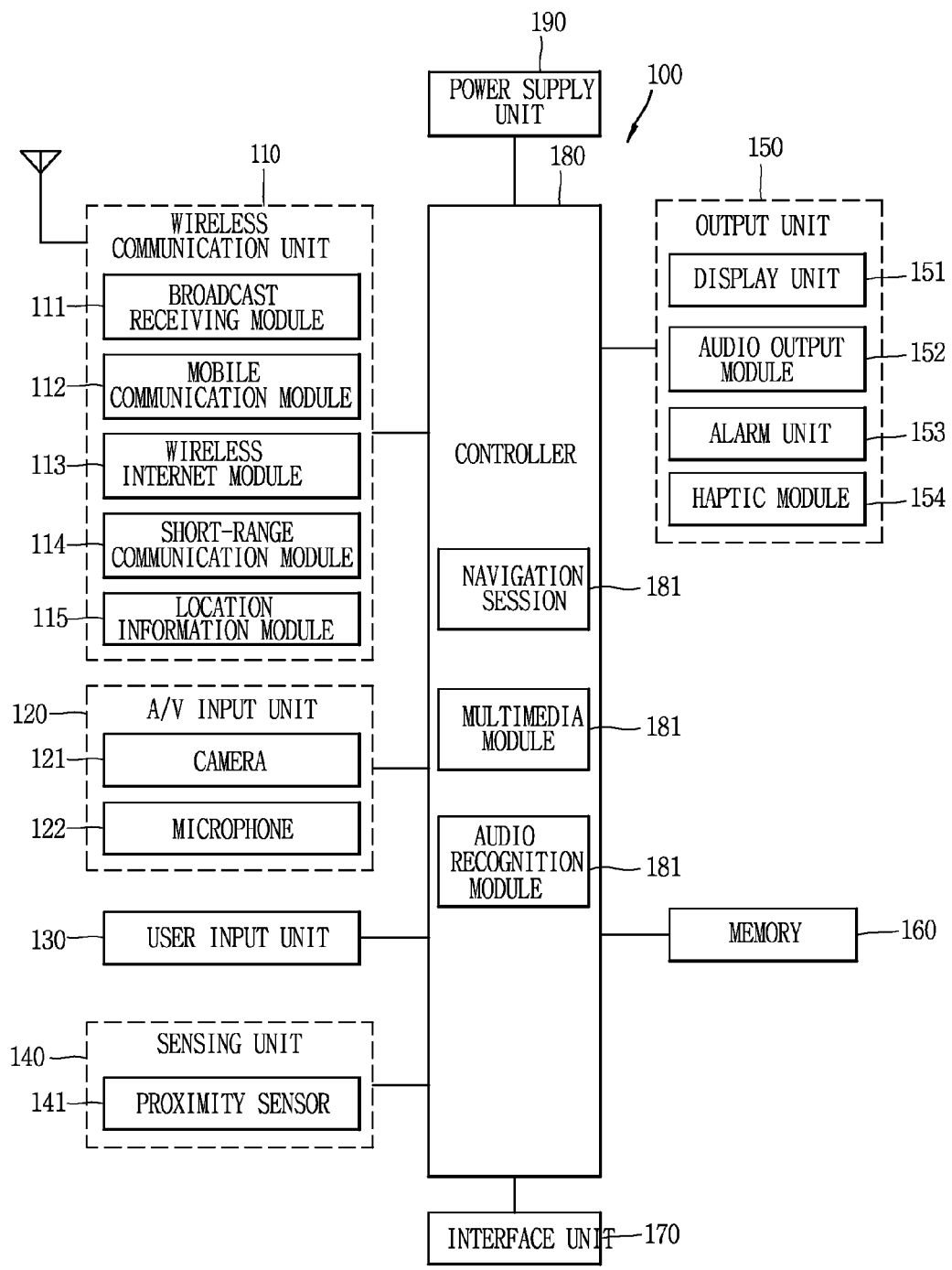
FIG. 1 is a view illustrating a configuration of a mobile terminal 100 to which a method of executing and installing an application disclosed in the present disclosure is applicable.

A technique disclosed in the present disclosure may be applied to a display apparatus and a method for executing and installing an application by a display apparatus. However, the technique disclosed in the present disclosure may be used for any display apparatuses, image display devices, terminals, and methods for executing and installing an application to which a technical concept of the technique is applicable, without being limited thereto.

For example, the technique disclosed in the embodiment of the present disclosure may be applied to various instruments or devices such as a digital television, a smart TV, a smart phone, a portable terminal, a mobile terminal, a personal digital assistant (PDA), a portable multimedia player (PMP) terminal, a notebook computer, a Wibro terminal, an Internet protocol television (IPTV) terminal, a digital broadcasting terminal, a telematics terminal, a navigation terminal, an audio video navigation (AVN) terminal, a television, a 3D television, an audio/video (A/V) system, a home theater system, an information providing center, a call center, and the like.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

In the following description of the present disclosure, usage of suffixes such as 'module', 'part' or 'unit' used for referring to elements is given merely to facilitate explanation of the present invention, without having any significant meaning by itself.

While terms such as "first" and "second," and the like, may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

The embodiments of the present invention will now be described with reference to the accompanying drawings, in which like numbers refer to like elements throughout, and a repetitive explanation will be omitted.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Description of Mobile Terminal According to an Embodiment Disclosed in the Present Disclosure FIG. 1 is a view illustrating a configuration of a mobile terminal 100 to which a method of executing and installing an application disclosed in the present disclosure is applicable. A mobile communication terminal (i.e., a mobile phone or a mobile terminal) 100 may be implemented in various forms. For example, the mobile communication terminal 100 may include a portable phone, a smart phone, a notebook computer, a digital broadcast terminal, a personal digital assistant (PDA), a portable multimedia player (PMP), or the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. FIG. 1 shows the mobile terminal as having various components, but it should be understood that implementing all of the illustrated components is not a requirement. Greater or fewer components may alternatively be implemented.

The wireless communication unit 110 may include one or more modules allowing radio communication between the mobile communication terminal 100 and a wireless communication system or a network in which the mobile terminal is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

Meanwhile, the broadcast associated information may also be provided via a mobile communication network and, in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be a GPS (Global Positioning System) module. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The location information module 115 may further include a geomagnetic sensor and/or a gravity sensor for detecting a direction. For example, the location information module 115 may detect a direction (e.g., east, west, south, and north) of a mobile communication terminal to implement navigation using augmented reality through the geomagnetic sensor (a digital magnetic compass). The location information module 115 detects in which direction gravity acts through the gravity sensor (G sensor), and when the user holds the mobile communication terminal in a vertically long direction, the location information module shows a vertically long screen, and when the user holds the mobile communication terminal in a horizontally long direction, the location information module automatically rotates the screen by 90 degrees to show a wider screen. Also, when the user views a video, the location information module 115 rotates the screen in a direction in which the user holds the mobile communication terminal through the gravity sensor (G sensor) to allow the user to conveniently view an image.

The A/V input unit 120 is configured to receive an audio or video signal. The A/V input unit 120 may include a camera 121 and a microphone 122. The camera 121 processes image data of still pictures or video obtained by an image capturing device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a liquid crystal display (LCD), a thin film transistor-LCD (TFT-LCD), an organic light emitting diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and a touch sensor are overlaid in a layered manner to form a touch screen, the display unit 151 may function as both an input device and an output device. The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

In an embodiment of the present invention, a proximity-touch refers to an approach of a pointer at a certain distance from a screen, rather than actually touching the screen.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The sensing unit 140 may include an acceleration sensor 142. The acceleration sensor 142 is an element for converting a change in acceleration in any one direction into an electrical signal, which is commonly used in line with the development of an MEMS (micro-electromechanical systems) technology. The acceleration sensor 142 includes various types of acceleration sensors from an acceleration sensor installed in an airbag system of a vehicle to measure acceleration having a great value used to sense collision to an acceleration sensor measuring acceleration having a fine value and used as an input unit for games, or the like, by recognizing a fine operation of user's hand. The acceleration sensor 142 is configured by installing sensors for measuring acceleration corresponding to 2-axis or 3-axis in a single package, and according to a usage environment, only a Z-axis may be required. Thus, when an acceleration sensor in an X-axis direction or Y-axis direction, instead of Z-axis direction, is required to be used for some reasons, the acceleration sensor may be installed to be stood on a main board by using a separate piece board.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPD's), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel route on map data.

Description of Image Display Device According to Embodiment Disclosed in Present Disclosure Hereinafter, a configuration of an image display device 200 employing an image processing device or a display apparatus according to embodiments of the present invention will be described with reference to FIGS. 2 to 6.

Figure 2:
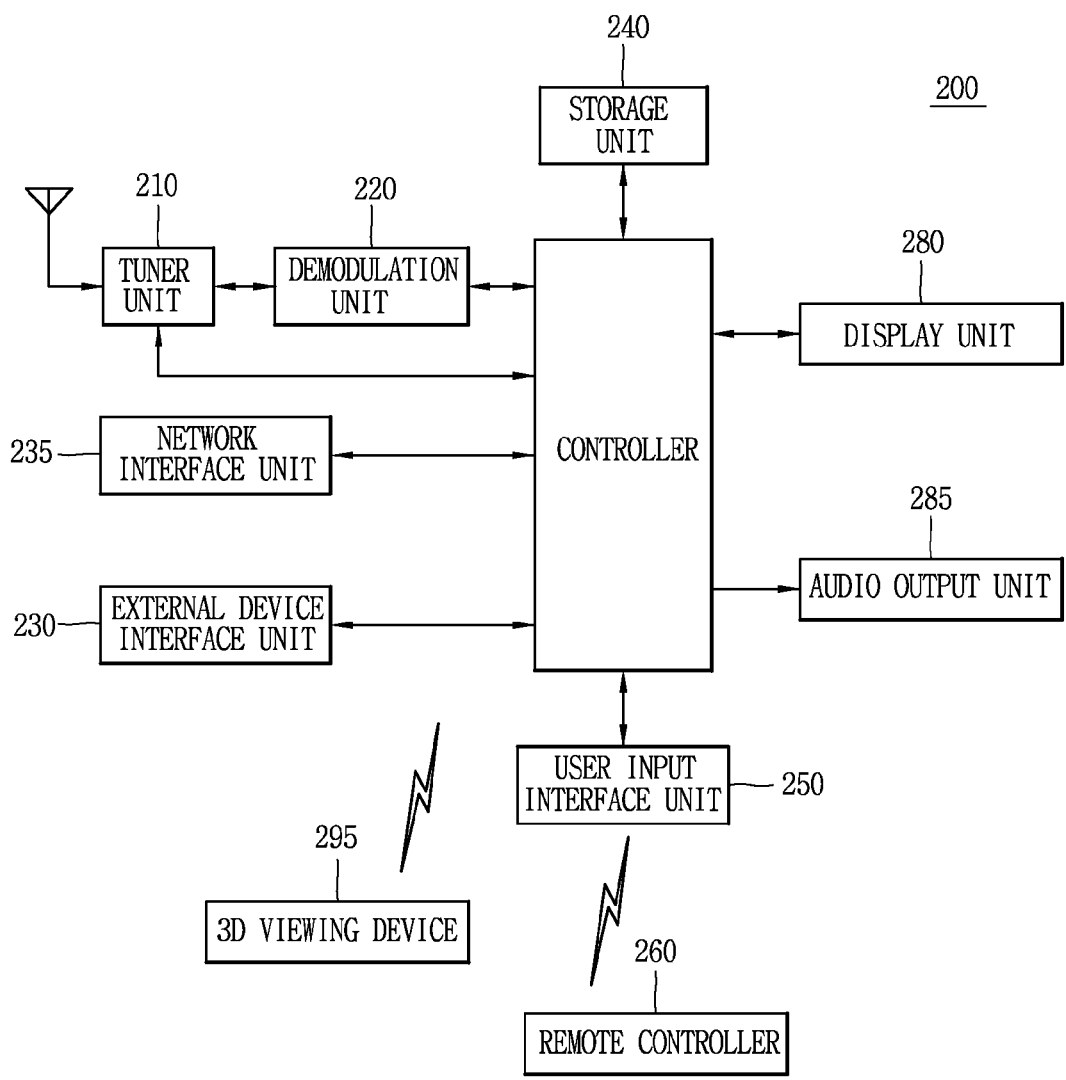
FIG. 2 is a view illustrating a configuration of an image display device 200 according to embodiments of the present invention.

FIG. 2 is a view illustrating a configuration of the image display device 200 according to embodiments of the present invention.

As illustrated in FIG. 2, the image display device 200 according to embodiments of the present invention may include a tuner 210, a demodulation unit 220, an external device interface unit 230, a network interface unit 235, a storage unit 240, a user input interface unit 250, a controller 270, a display 280, an audio output unit 285, and a 3D viewing device 295.

The tuner 210 selects an RF broadcast signal corresponding to a channel selected by a user from among radio frequency (RF) broadcast signals received though an antenna or all the stored channels. The tuner 210 converts the selected RF broadcast signal into an intermediate frequency signal or a baseband video or audio signal. For example, when the selected RF broadcast signal is a digital broadcast signal, the tuner 210 converts the selected RF broadcast signal into a digital IF (DIF) signal, and when the selected RF broadcast signal is an analog broadcast signal, the tuner 210 converts the selected RF broadcast signal into an analog baseband video or audio signal (CVBS/SIF). Namely, the tuner 210 may process the digital broadcast signal or the analog broadcast signal.

The analog baseband video or audio signal (CVBS/SIF) output from the tuner 210 may be directly input to the controller 270.

Also, the tuner 210 may receive an RF broadcast signal of a single carrier according to an ATSC (Advanced Television System Committee) scheme or an RF broadcast signal including a plurality of carriers according to a DVB (Digital Video Broadcasting) scheme.

Meanwhile, the tuner 210 may sequentially select RF broadcast signals of all the stored broadcast channels through a channel storage function from among the RF broadcast signals received through the antenna, and convert them into baseband video or audio signals.

The demodulation unit 220 receives the converted digital IF (DIF) signal from the tuner 210, and performs a demodulation operation thereon. For example, when the digital IF signal output from the tuner 210 is based on the ATSC scheme, the demodulation unit 220 performs 8-VSB (7-Vestigal Side Band) demodulation. Also, the demodulation unit 220 may perform channel decoding.

The demodulation unit 220 may include a trellis decoder, a deinterleaver), a Reed-Solomon decoder, and the like, to perform trellis decoding, deinterleaving, and Reed-Solomon decoding. For example, when the digital IF signal output from the tuner 210 is based on the DVB scheme, the demodulation unit 220 performs COFDMA (Coded Orthogonal Frequency Division Modulation) demodulation. Also, the demodulation unit 220 may perform channel decoding. To this end, the demodulation unit 220 may include a convolution decoder, a deinterleaver, a Reed-Solomon decoder, and the like, to perform convolution decoding, deinterleaving, and Reed-Solomon decoding.

After performing demodulation and channel decoding, the demodulation unit 220 may output a stream signal (TS). In this case, the stream signal may be a signal in which a video signal, an audio signal, or a data signal is multiplexed. For example, the stream signal may be an MPEG-2 TS (Transport Stream) in which an MPEG-2 standard video signal, a dolby AC-3 standard audio signal, and the like are multiplexed. In detail, the MPEG-2 TS may include a 4-byte header and 184-byte payload.

The demodulation unit 220 may be separately provided according to the ATSC scheme and the DVB scheme. An ATSC demodulation unit and a DVB demodulation unit may be separately provided.

The stream signal output from the demodulation unit 220 may be input to the controller 270. After performing demultiplexing, video/audio signal processing, and the like, the controller 270 outputs an image to the display unit 280 and outputs a sound to the audio output unit 285.

The external device interface unit 230 may transmit or receive data to or from a connected external device. To this end, the external device interface unit 230 may include an A/V input/output unit (not shown) or a wireless communication unit (not shown).

The external device interface 230 may be connected to an external device (not shown) such as a DVD (Digital Versatile Disk), a Blu ray, a game machine, a camera, a camcorder, a computer (notebook), or the like through a fixed line or wirelessly. The external device interface unit 230 transfers a video signal, an audio signal, or a data signal input from the outside though a connected external device to the controller 270 of the image display device 200. Also, the external device interface unit 230 may output a video signal, an audio signal, or a data signal processed in the controller 270 to the connected external device. To this end, the external device interface unit 230 may include an A/V input/output unit (not shown) or a wireless communication unit (not shown).

In order to input a video signal and an audio signal of an external device to the image display device 200, the A/V input/output unit may include a USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, a D-SUB terminal, and the like.

The wireless communication unit may perform short-range wireless communication with a different electronic device. The image display device 200 may be connected to a different electronic device via a network according to a communication standard such as Bluetooth™, Radio Frequency IDentification (RFID), Infrared Data Association (IrDA), Ultra-WideBand (UWB), ZigBee™, digital living network alliance (DLNA), and the like.

Also, the external device interface unit 230 may be connected to various set-top boxes (STBs) through at least one of the forgoing various terminals to perform an input/output operation with the STB.

Meanwhile, the external device interface unit 230 may transmit and receive data to and from the 3D viewing device 295.

The network interface unit 235 provides an interface for connecting the image display device 200 to a wired/wireless network including the Internet. For a connection to a wired network, the network interface unit 235 may include an Ethernet terminal, or the like, and for a connection to a wireless network, the network interface unit 235 may use a communication standard such as WLAN (Wireless LAN)(Wi-Fi), Wibro Wireless broadband), Wimax (World Interoperability for Microwave Access), HSDPA (High Speed Downlink Packet Access), or the like.

The network interface unit 235 may receive contents or data provided by an Internet or contents provider or a network operator through a network. Namely, the network interface unit 235 may receive contents such as movie, an advertisement, games, VOD, a broadcast signal, and the like, and relevant information provided from an Internet or contents provider or a network operator. Also, the network interface unit 235 may receive a firmware update information and update file provided by a network operator. Also, the network interface unit 235 may transmit data to an Internet or contents provider or a network operator.

Also, in order to allow the image display device 200 to perform two-way communication, the network interface unit 235 may be connected to, for example, an IP (Internet Protocol) TV to receive a video signal, an audio signal, or a data signal processed in a set-top box for an IPTV and transfer the same to the controller 270, and transfer signals processed in the controller 270 to the set-top box for an IPTV.

Meanwhile, the foregoing IPTV may include ADSL-TV, VDSL-TV, FTTH-TV, and the like, according to a type of a transport network, and may include TV over DSL, Video over DSL, TV overiP (TVIP), Broadband TV (BTV), and the like. Also, the IPTV may include an Internet TV available for Internet access, or a full browsing TV.

The storage unit 240 may store a program for processing and controlling respective signals of the controller 270, and store processed video, audio, or data signal.

Also, the storage unit 240 may serve to temporarily store a video signal, an audio signal, or a data signal input to the external device interface unit 230. Also, the storage unit 240 may store information regarding a predetermined broadcast channel through a channel storage function such as a channel map, or the like.

The storage unit 240 may include at least one type of storage medium including a flash memory, a hard disk, a multimedia card micro type, a card-type memory (e.g., SD or DX memory, etc), a random access memory (RAM), a read-only memory (ROM), and an electrically erasable programmable read-only memory (EEPROM). The image display device 200 may reproduce a file (a video file, a still image file, a music file, a document file, and the like) stored in the storage unit 240 and provide the same to a user.

FIG. 2 illustrates an embodiment in which the storage unit 240 is provided separately from the controller 270, but the scope of the present invention is not limited thereto and the storage unit 240 may be included in the controller 270.

The user input interface unit 250 transfers a signal input by the user to the controller 270 or transfers a signal from the controller 270 to the user. For example, the user input interface unit 250 may receive a user input signal such as power ON/OFF, channel selection, screen setting, and the like, from the remote controller 260 or transmit a signal from the controller 270 to the remote controller 260 according to various communication schemes such as an RF communication scheme, an infrared (IR) communication scheme, and the like.

Also, for example, the user input interface unit 250 may transfer a user input signal input from a local key (not shown) such as a power key, a channel key, a volume key, a setting key, or the like, to the controller 270.

Also, for example, the user input interface unit 250 may transfer a user input signal input from a sensing unit (not shown) sensing a user's gesture to the controller 270, or transmit a signal from the controller 270 to the sensing unit (not shown). Here, the sensing unit (not shown) may include a touch sensor, a voice sensor, a position sensor, an operation sensor, and the like.

The controller 270 may demultiplex a stream input through the tuner 210, the demodulation unit 220, or the external device interface unit 230, or process a demultiplexed input stream or process demultiplexed signals to generate and output a signal for video or audio output.

The processed video signal of the controller 270 may be input to the display unit 280 and displayed as an image corresponding to the video signal. Also, the processed video signal of the controller 270 may be input to an external output device through the external interface unit 230.

The processed audio signal of the controller 270 may be output to the audio output unit 285. Also, the processed audio signal of the controller 270 may be input to an external output device through the external device interface unit.

The controller 270 may include a demultiplexing unit, an image processing unit, and the like. The controller 270 may control a general operation of the image display device 200. For example, the controller 270 may control the tuner 210 to tune an RF broadcast corresponding to a channel selected by the user or corresponding to a previously stored channel.

Also, the controller 270 may control the image display device 200 according to a user command input through the user input interface unit 250 or according to an internal program.

For example, the controller 270 may control the tuner 210 to input a signal of a channel selected according to a predetermined channel selection command received through the user input interface unit 250. The controller processes a video signal, an audio signal, or a data signal of the selected channel. The controller 270 may output channel information selected by the user together with the processed video signal or audio signal through the display 280 or the audio output unit 285.

In another example, the controller 270 may output a video signal or an audio signal from an external device, e.g., a camera or a camcorder, input through the external device interface unit 230 to the display 280 or the audio output unit 285 according to an external device video reproduction command received through the user input interface unit 250.

The controller 270 may control the display 280 to display an image. For example, the controller 270 may control the display 280 to display a broadcast image input through the tuner 210, an external input image input through the external device interface unit 230, an image input through the network interface unit 235, or an image stored in the storage unit 240. Here, the image displayed on the display 280 may be a still image or video and may be a 2D image or a 3D image.

The controller 270 may generate a 3D object with respect to a certain object in an image displayed on the display 280 and display the same. For example, the object may be at least one of an accessed Web screen (newspaper, magazine, or the like), an EPG (Electronic Program Guide), various menus, a widget, an icon, a still image, a video, and text. The 3D object maybe processed to have a different depth from an image displayed on the display 280. The controller 270 may process the 3D object such that it is seen to be protruded relative to an image displayed on the display 280.

The controller 270 recognizes a location of the user based on an image captured by an image capture unit (not shown). For example, the controller 2780 may recognize a distance (z-axis coordinates) between the user and the image display device 200. Besides, the controller 270 recognizes x-axis coordinates and y-axis coordinates in the display 280 corresponding to a user location.

Meanwhile, although not shown in FIG. 2, a channel browsing processing unit generating a thumbnail image corresponding to a channel signal or an external input signal may be further provided. The channel browsing processing unit may receive a stream signal (TS) output from the demodulation unit 220 or a stream signal output from the external device interface unit 230 and extract an image from the input stream signal to generate a thumbnail image. The generated thumbnail image is coded as it is so as to be input to the controller 270. Also, the generated thumbnail image may be coded into a stream form and input to the controller 270.

The controller 270 may display a thumbnail list including a plurality of thumbnail images by using input thumbnail images on the display 280. The thumbnail list in this case may be displayed according to a simple view scheme in which it is displayed in a partial region or may be displayed according to an entire view scheme in which it is displayed in the most region of the display 280, while a certain image is displayed on the display 280. Thumbnail images on the thumbnail list may be sequentially updated.

The display 280 may convert a video signal, a data signal, an OSDD signal, or a control signal processed in the controller 270 or a video signal, a data signal, a control signal, and the like, received by the external device interface unit 230 to generate a driving signal.

The display 280 may include a PDP, an LCD, an OLED, a flexible display, and the like, and in particular, the display 280 may include a 3D display according to an embodiment of the present invention.

For 3D image viewing, a display scheme of the display 280 may be divided into an additional display scheme and an exclusive display scheme. According to the exclusive display scheme, the display 280 solely implements a 3D image without an additional display, e.g., glasses, or the like. For example, various schemes such as a lenticular scheme, a parallax barrier, and the like, may be applied. According to the additional display scheme, a 3D image may be implemented by using a different display in addition to the display 280. For example, a head mount display (HDD) type, a glass type, and the like, may be applied.

The glass type may be divided into a passive scheme such as a polarized glass type, or the like, and an active scheme such as a shutter glass type, or the like. Meanwhile, the head mount display type may be divided into a passive scheme and an active scheme.

The 3D viewing device (3D glasses) 295 for viewing a stereoscopic image may include passive type polarized glasses or active type shutter glasses, and may also include the forgoing head mount type.

Meanwhile, the display 280 may be configured as a touch screen so as to be used as an input device as well as as an output device.

The audio output unit 285 receives an audio signal, e.g., a stereo signal, a 3.1 channel signal, or a 5.1 channel signal, from the controller 270, and outputs a sound. The audio output unit 185 may be implemented as various types of speakers.

Meanwhile, in order to sense a user's gesture, as described above, a sensing unit (not shown) including at least one of the touch sensor, an audio sensor, a position sensor, and an operation sensor may be further provided in the image display device 200. A signal sensed by the sensing unit (not shown) may be delivered to the controller 170 through the user input interface unit 150.

The controller 270 may sense a user's gesture by using images captured by an image capture unit (not shown) or sensing signals from the sensing unit (not shown) separately, or by combining them.

The remote controller 260 may transmit a user input to the user input interface unit 250. To this end, the remote controller 260 may use Bluetooth™ Radio Frequency IDentification (RFID), Infrared Data Association (IrDA), Ultra-WideBand (UWB), ZigBee™, and the like. Also, the remote controller 260 may receive a video signal, an audio signal, a data signal, or the like, output from the user input interface unit 250 and display it or may output a corresponding sound.

The foregoing image display device 200 may be a fixed type digital broadcast receiver able to receive at least one of an ATSC type (7-VSB type) digital broadcast, a DVB-T type (COFDM type) digital broadcast, and an ISDB-T type (BST-OFDM type) digital broadcast. Also, the foregoing image display device 200 may be a mobile IPTV digital broadcast receiver able to receive at least one of a terrestrial DMB type digital broadcast, a satellite DMB type digital broadcast, an ATSC-M/H type digital broadcast, a DVB-H type (COFDM type) digital broadcast, and a media flow (Media Forward Link Only) type digital broadcast. Also, the image display device 200 may be a digital broadcast receiver for a cable, satellite communication, or IPTV.

The image display device described in the present disclosure may include a display apparatus, a smart TV, a digital television, a TV receiver, a mobile phone, a smart phone, a notebook computer, a digital broadcast terminal, a PDA (Personal Digital Assistant), a PMP (Portable Multimedia Player), and the like.

The configuration of the image display device illustrated in FIG. 2 is a configuration for embodiments of the present invention. The respective elements of the configuration may be integrated, added, or omitted according to a specification of the image display device 200. Namely, two or more elements may be integrated into one component or one element may be divided into two or more elements. Also, functions performed in each block is for an embodiment of the present invention and a detailed operation and device dopes not limit the coverage of the present invention.

A video signal decoded in the image display device 200 may be a 3D video signal of various formats. For example, a video signal decoded in the image display device 200 may be a 3D video signal comprised of a color image and a depth image, or may be a 3D video signal comprised of a plurality of view video signals. The plurality of view video signals may include, for example, a left eye video signal and a right eye video signal. Here, a format of the 3D video signal may be a side by side format in which a left eye video signal L and a right eye video signal R are disposed horizontally, a top down format in which a left eye video signal L and a right eye video signal R are disposed up and down, a frame sequential format in which a left eye video signal L and a right eye video signal R are disposed by time division, an interlaced format in which a left eye video signal L and a right eye video signal R are mixed by line, a checker box format in which a left eye video signal L and a right eye video signal R are mixed by box, and the like.

Description of Display Apparatus According to Embodiments Disclosed in the Present Disclosure A display apparatus for executing an application according to embodiments disclosed in the present disclosure may include a display unit configured to display an image in relation to a first application on a screen, a communication unit configured to transmit and receive data in relation to the first application, and a controller configured to execute the first application, control the display unit to display a list of external devices able to execute a second application included in the first application on the screen, and control the communication unit to transmit the second application to an external device selected from the list of the external devices, wherein the first application is downloaded from a server.

According to an embodiment of the present invention, the second application may be a Web application, and the selected external device has a platform application able to drive the Web application.

Also, according to an embodiment of the present invention, the controller may determine whether or not the platform application has been executed, and when the platform application has been executed, the controller may transmit the second application to the selected external device, and when the platform application has not been executed, the controller may transmit a control signal such that guide information in relation to execution of the platform application is provided by the selected external device.

Also, according to an embodiment of the present invention, the controller may control the display unit to display information in relation to the first application on the screen.

Also, according to an embodiment of the present invention, the information in relation to the first application may be information indicating that the first application includes the second application.

Also, according to an embodiment of the present invention, the controller may control the display unit to display an icon in relation to execution of the first application on the screen and display an indicator indicating information that the first application includes the second application on the icon displayed on the screen.

Figure 3:
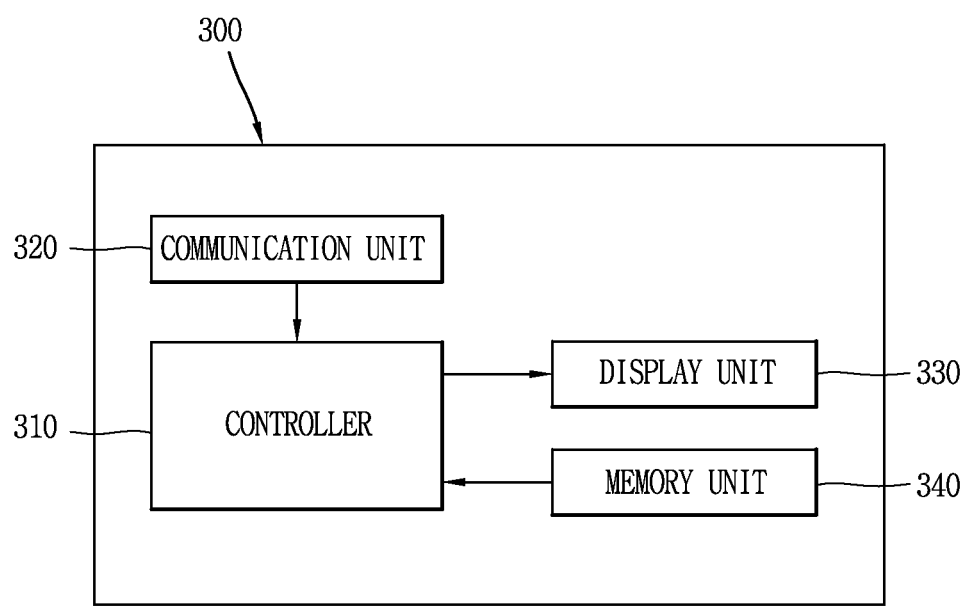
FIG. 3 is a view illustrating a configuration of a display apparatus according to embodiments disclosed in the present disclosure.

FIG. 3 is a view illustrating a configuration of a display apparatus according to embodiments disclosed in the present disclosure.

Referring to FIG. 3, a display apparatus according to embodiments disclosed in the present disclosure may include a controller 310, a communication unit 320, and a display unit 330.

Also, the display apparatus 300 according to an embodiment of the present invention may further include a memory unit 340 storing various types of information used to provide an inter-device interworking function through execution and installation of an application.

Besides, the display apparatus 300 may further include various elements to provide an inter-device interworking function through execution and installation of an application.

The elements illustrated in FIG. 3 are not essential and the display apparatus 300 may be implemented by greater or fewer elements.

Also, the display apparatus 300 disclosed in the present disclosure may also be implemented with the foregoing configuration of the mobile terminal or the image display device, so the elements illustrated in FIG. 3 may be implemented by the elements illustrated in FIG. 1 or FIG. 2, separately, or by combining the elements. For example, the controller 310 may correspond to the controller 180 of FIG. 1 or the controller 270 of FIG. 2 or may perform a function combining the function of the controller 180 of FIG. 1 or the function of the controller 270 of FIG. 2 and a partial function of other elements.

Hereinafter, the elements will be described.

The controller 310 may perform various functions to provide an inter-device interworking function through execution and installation of an application.

Basically, the controller 310 may serve to control the elements of the display apparatus 300 in order to provide an inter-device interworking function through execution and installation of an application. Here, an application may refer to an application program the display apparatus may execute. Also, the application may refer to an App, a program used in a mobile device, a smart TV, or the like.

The controller 310 may execute a first application in relation to the application apparatus 300.

Also, the controller 310 may search for an external device that may be able to execute a second application included in the first application.

Also, the controller 310 may generate a list of external devices by listing information regarding searched external devices.

Also, the controller 310 may control the display unit 330 to display the list of external devices on the screen of the display apparatus 300.

Here, the first application may be an application in relation to a digital television, and the second application may be an application in relation to a mobile device. In this case, the display apparatus 300 may be a digital television (e.g., a smart TV), and the external device may be a mobile device (e.g., a smart phone).

According to a modification, the first application may be an application in relation to a mobile device, and the second application may be an application in relation to a digital television. In this case, the display apparatus 300 may be a mobile device (e.g., a smart phone), and the external device may be a digital television (e.g., a smart TV).

The controller 310 may control the communication 320 to transmit the second application to an external device selected from the list of the external devices.

Here, the first application may be downloaded from a server.

The server may be a server in relation to a service that may be able to download a particular application. For example, the server may be a server in relation to an application store (or an App store). The application store may be an application store that may be able to download a TV application or a mobile application.

Also, according to an embodiment of the present invention, the second application may be a Web application, and the selected external device may include a platform application that may be able to drive a Web application.

The Web application may be an application (or App) generated to be operated in a Web browser.

An existing mobile application is generated to be operated separately from a (Webkit-installed) browser, but the Web application may be generated to be driven in a mobile Web environment.

In this case, inconvenience of generating each application to be used for an I-phone, an android phone, and a window may be eliminated to considerably reduce costs and time, and there may be an advantage in that a process of registering and inspecting and inspecting an application is not required to be performed. Namely, an application not dependent upon a mobile platform (e.g., iOS, Android, and the like) of a device may be generated.

Also, according to an embodiment of the present invention, the selected external device may install the second application in the platform application.

Also, according to an embodiment of the present invention, the selected external device may display an indicator indicating an installation process of the second application on the screen of the selected external device.

Also, according to an embodiment of the present invention, the display apparatus 300 may be a digital television, and the platform application may e a remote controller application performing a remote controller function with respect to the digital television.

In this case, the first application may be an application in relation to the digital television, and the second application may be a Web application in relation to a mobile device (e.g., a smart phone).

Thus, when the selected external device (or the mobile device) has a remote application as a platform application in relation to the television, the second application may be installed and executed in the remote controller application irrespective of whether or not a mobile platform of the selected external device is for an I-phone, an android phone, or a window.

The remote controller application may be an application which is generally greatly prevalent, and the user may easily install and use the second application by executing the remote controller application.

Also, when an application developer develops a type of application; advantageously, the application is able to support the interworking function with various types of devices.

When the second application is installed in the remote controller application and executed, the display apparatus 300 and the selected external device may be able to interwork. For example, when the first application and the second application are a particular game (e.g., a Go-Stop game), the display apparatus 300 may provide an interworking function with the selected external device to allow the users to enjoy a multi-user game.

Also, when the display apparatus 300 is a digital television and a plurality of external devices are selected, a plurality of users may enjoy a game by using a large screen of the digital television.

The controller 310 may control the communication unit 320 to transmit the second application to the selected external device, and determine whether or not the platform application has been executed.

In this case, when the platform application has been executed, the controller 310 may transmit the second application to the selected external device, and when the platform application has not been executed, the controller 310 may transmit a control signal to provide guide information in relation to execution of the platform application by the selected external device.

The selected external device may provide the guide information in various forms to a user of the selected external device based on the control signal.

For example, the guide information may be a pop-up menu displayed on the screen of the selected external device and checking whether to execute the platform application. Thus, the selected external device may display the pop-up menu on the screen of the external device.

In this case, the selected external device may execute the platform application based on a user selection input corresponding to the pop-up menu.

Also, according to an embodiment of the present invention, the selected external device may be a plurality of selected external devices.

In this case, the controller 310 may perform an authentication procedure on each of the selected external devices for a connection with the plurality of selected external devices in transmitting the second application.

For example, when the display apparatus 300 is a digital television, the authentication may refer to TV authentication.

A purpose of the authentication is not to transmit confidential data or message to a unreliable mobile device (or a selected external device), because a first application (e.g., a Web application or a Web App) driven in the TV includes a second application (e.g., a mobile Web App).

As the authentication method, a standard method may be used or a unique protocol of a device itself may be used.

The standard method may include an ID/password, a certificate, an SSL/TLS, a digest authentication method, and the like.

Also, the unique protocol of a device may include a method for generating an authentication number with a MAC address of a network Ethernet card of a TV, a method for displaying an authentication number on the TV, a method for inputting, by a mobile device, an authentication number displayed on the TV to request authentication from the TV, a method for permitting, by the TV, only an authentication-completed mobile device to perform communication, and the like. Besides, it would be obvious for a person skilled in the art that various other authentication methods are applicable to the display apparatus and the method for executing and installing an application disclosed in the present disclosure.

In detail, the controller 310 may assign an authentication number to the authentication-completed external device.

Also, the controller 310 may transmit the second application to the authentication-completed external device according to the assigned authentication number.

Also, according to an embodiment of the present invention, the server may provide a user interface (UI) supporting downloading of the first application to the display apparatus 300.

In this case, the display apparatus 300 (or the controller 310 that may perform a specific operation, hereinafter) may control the display unit 330 to display a screen in relation to the UI.

Also, the display apparatus 300 may control the display unit 330 to display an indicator indicating information that the first application includes the second application, on the screen in relation to the UI.

The display apparatus 300 may download the first application by using the UI.

Also, when the display apparatus 300 has downloaded and installed the first application through the server, it may display an indicator indicating information that the downloaded first application includes the second application, on the screen.

Also, according to an embodiment of the present invention, the display apparatus 300 may display an icon in relation to execution of the first application on the screen, and display the indicator on the icon.

The communication unit 320 may serve to communicate with an internal certain element, a certain at least one external device, or a terminal connected wirelessly or through a fixed line (or through a wired/wireless communication network). Here, the external device or the terminal may include a network service system, a server, and the like.

For example, the communication unit 320 may communicate with the selected external device or a server that may be able to download the first application (or may transmit and receive particular data or a particular application).

The display apparatus 300 may serve to control the external device or the terminal.

The display apparatus 300 and the external devices to be controlled may be connected by a fixed line medium or a wireless medium, and may use a wired/wireless control protocol appropriate for a medium for controlling.

The connection medium may be at least one of an optical fiber, a cable, a power line, a radio frequency (RF), and an infrared ray. Besides, it would be obvious for a person skilled in the art that various connection mediums are applicable to the embodiment disclosed in the present disclosure.

Various wired or wireless communication protocol for the controlling may exist.

First, as a protocol in relation to short-range communication, Bluetooth™ RFID (Radio Frequency Identification), IrDA (infrared Data Association), UWB (Ultra Wideband), ZigBee™, Wireless LAN (protocols such as Bluetooth, 802.11n, etc.), near field communication (NFC), and the like, may be used.

Also, as a wireless Internet technology, a wireless LAN (WLAN), Wi-Fi, wireless broadband (Wibro), world interoperability for microwave access (Wimax), HSDPA (High Speed Downlink Packet Access), IEEE 802.16, long term evolution (LTE), wireless mobile broadband service (WMBS), and the like, may be used.

Also, a protocol or an interface in relation to wired communication may include a USB (Universal Serial Bus) port, an IEEE1394, HDMI (High-Definition Multimedia Interface) port, a DP (Display Port), a wired/wireless headset port, an external charger port, a wired/wireless data port, a memory card port, a port connecting a device having an identification module, an audio I/O (Input/Output) port, a video I/O (Input/Output), an earphone port, or the like.

The display unit 330 may serve to display (or output) information process in the display apparatus 300. The information may be displayed on or output to a particular screen.

Also, when the display apparatus 300 performs a particular function, the display unit 330 may display a user interface (UI) or a graphic user interface (GUI) in relation to the particular function.

According to an embodiment disclosed in the present disclosure, the display unit 330 may display a list of external devices that may be able to execute the second application included in the first application on the screen of the display apparatus 300.

Also, the display unit 330 may display 3D contents (or a 3D image) provided by the display apparatus 300. Also, the display unit 330 may display various graphic objects such as a 3D image, a 3D object, and the like, included in the 3D contents.

Also, according to an embodiment of the present invention, the server providing the first application may provide a UI supporting downloading of the first application to the display apparatus 300.

In this case, the display unit 330 may display a screen in relation to the UI and may display an indicator indicating information that the first application includes the second application on the screen in relation to the UI.

Also, according to an embodiment of the present invention, when the display apparatus 300 has downloaded the first application from the server and installed it, the display unit 330 may display an indicator indicating information that the first application includes the second application on the screen.

Accordingly, the user of the display apparatus 300 may execute the first application, while recognizing the information indicating the fact that the first application includes the second application through the indicator.

Also, the display unit 330 may display an icon in relation to execution of the first application and display the indicator on the icon.

The display unit 330 may include at least one of a liquid crystal display (LCD), a thin film transistor-LCD (TFT-LCD), an organic light emitting diode (OLED) display, a flexible display, a three-dimensional (3D) display, and an e-ink display.

Some of these displays may be configured as transparent or light-transmissive displays through which a user may see the outside. These displays may be called transparent displays. A representative example of the transparent displays may be a transparent OLED (TOLED), and the like. The rear structure of the display unit 330 may also be configured as a light-transmissive structure. Through such a structure, the user can see an object positioned at the rear of the body of the display apparatus through an area occupied by the display unit 330.

Various types of visual information may be displayed on the display unit 330. The information may be displayed in the form of character, number, symbol, graphic, icon, or the like, and may be configured as a 3D stereoscopic image.

The display unit 330 may be operated as a whole region or may be divided into a plurality of regions so as to be accordingly operated. In the latter case, the plurality of regions may be operated in association with each other.

For example, an output window and an input window may be displayed at upper and lower portions of the display unit 330, respectively. Soft keys including numbers for inputting a phone number, or the like, may be output to the input window. When a soft key is touched, a number corresponding to the touched soft key is displayed on the output window. When the manipulation unit is manipulated, a call connection with respect to a phone number displayed on the output window is attempted, or text displayed on the output window may be input to an application.

The display unit 330 may be configured to receive a touch through scrolling. The user may move a cursor or a pointer positioned on an entity, e.g., an icon, or the like, displayed on the display unit 330 by scrolling the display unit 330. In addition, when the user moves his finger on the display unit 330, the path along which the user's finger moves may be visually displayed on the display unit 130. This will be useful in editing an image displayed on the display unit 330.

The display unit 330 may include a touch screen. For example, one function of the display apparatus 300 may be executed in case that the touch screen of the display unit 330 is touched in conjunction within a certain time range. The touches in conjunction may be clamping the body of the display apparatus 300 with the user's thumb and index finger. The one function may be, for example, activation or deactivation of the display unit 330.

The memory unit 340 may play a role of storing information processed in the display apparatus 300.

According to an embodiment of the present invention, the memory unit 340 may store a first application downloaded from a particular server.

Also, the memory unit 340 may store information in relation to the first application.

The information in relation to the first application may be information in relation to at least one of 2D content, 3D content, and a UI corresponding to the first application.

Also, for example, the memory unit 340 may serve to store 3D content (or 2D content) provided by the display apparatus 300. In detail, the memory unit 340 may store a 3D image or a 3D object included in the 3D content, and store depth information regarding the 3D image or the 3D object, and the like. Also, when the 3D image or the 3D object is processed by the controller 310, the memory unit 340 may store the process results.

Also, the memory unit 340 may store various user interfaces and/or graphic user interfaces in relation to functions performed by the display apparatus 300.

Also, the memory unit 340 stores data, programs, and the like, required for the display apparatus 300 to operate.

The memory unit 340 may include at least one type of storage medium including a flash memory, a hard disk type, a multimedia card micro type, a card-type memory (e.g., SD or XD memory, etc), a magnetic memory, a magnetic disk, an optical disk, a random access memory (RAM), a static random access memory (SRAM), a read-only memory (ROM), an electrically erasable programmable read-only memory (EEPROM), a programmable read-only memory (PROM), and an SSD (Solid State Disk). Also, the image display device 200 may operate a web storage performing a storage function of the memory unit 340 on the Internet, or may be operated in relation to the web storage device.

Method for Executing Application According to Embodiments Disclosed in the Present Disclosure A method of executing an application of a display apparatus according to embodiments disclosed in the present disclosure includes: executing a first application; displaying a list of external devices able to execute a second application included in the first application, on a screen of the display apparatus; and transmitting the second application to an external device selected from the list of eternal devices, wherein the first application is downloaded from the server to the display apparatus.

Figure 4:
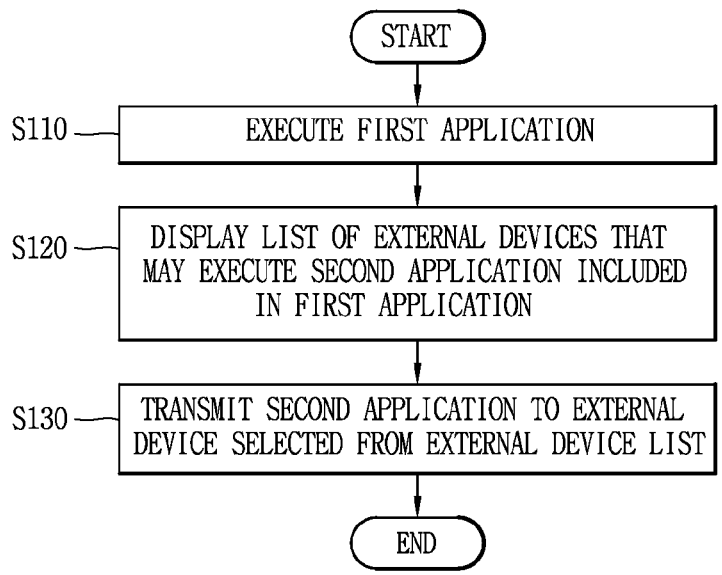
FIG. 4 is a flow chart illustrating a method for executing an application according to embodiments disclosed in the present disclosure.

FIG. 4 is a flow chart illustrating a method for executing an application according to embodiments disclosed in the present disclosure.

Referring to FIG. 4, the method for executing an application according to embodiments disclosed in the present disclosure may include the following steps.

First, the display apparatus may execute a first application (step S110).

Next, the display apparatus may display a list of external devices that may be able to execute the second application included in the first application on the screen (step S120).

Thereafter, the display apparatus may transmit the second application to an external device selected from the list of the external devices (step S130).

Here, the first application may be downloaded from a server to the display apparatus.

Method for Installing Application According to Embodiments Disclosed in the Present Disclosure A method for installing an application of a device including a platform application able to drive a Web application according to embodiments disclosed in the present disclosure, includes: connecting the device to a display apparatus in which a first application is executed through a fixed line or wirelessly; receiving a second application included in the first application from the display apparatus; and installing the second application in the platform application, wherein the first application and the second application may be Web applications and the first application may be downloaded from a server to the display apparatus.

Figure 5:
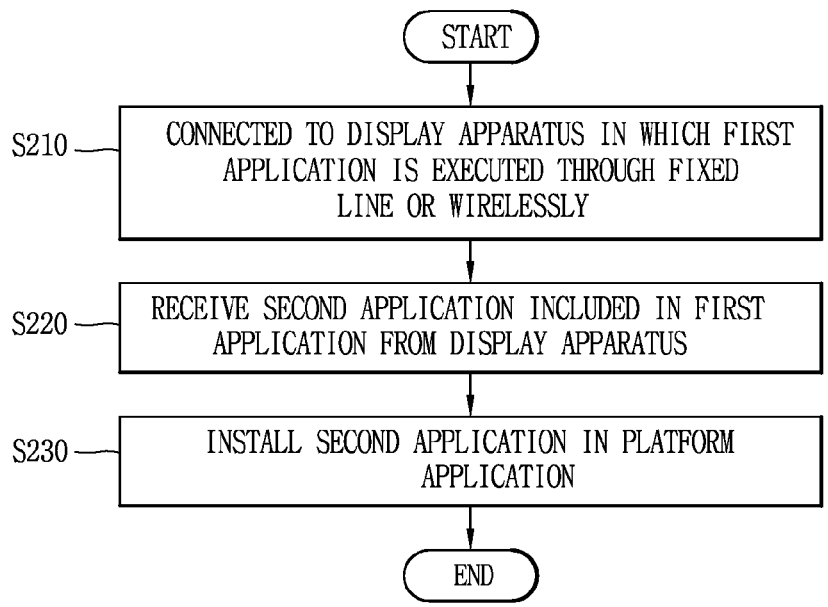
FIG. 5 is a flow chart illustrating a method for installing an application according to embodiments disclosed in the present disclosure.

FIG. 5 is a flow chart illustrating a method for installing an application according to embodiments disclosed in the present disclosure.

Referring to FIG. 5, the method for installing an application according to embodiments disclosed in the present disclosure may include the following steps.

First, a device having the platform application may be connected to a display apparatus executing a first application through a fixed line or wirelessly (step S210).

Next, the device may receive a second application included in the first application from the display apparatus (step S220).

Thereafter, the device may install the second application in the platform application (step S230).

Here, the first application and the second application may be Web applications and the first application may be downloaded from a server to the display apparatus.

First Embodiment

Description of Interworking Technique Between Devices Using a Remote Platform App The first embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the first embodiment disclosed in the present disclosure.

The first embodiment disclosed in the present disclosure relates to an inter-device interworking technique between a display apparatus and at least one external device connected to the display apparatus through a fixed line or wirelessly and including a remote platform app (or application).

According to the first embodiment disclosed in the present disclosure, a method for executing an application of a display apparatus includes executing a first application, displaying a list of external devices able to execute a second application included in the first application, on a screen of the display apparatus, and transmitting the second application to an external device selected from the list of eternal devices, wherein the first application is downloaded from the server to the display apparatus.

According to the first embodiment of the present invention, the first application may be an application in relation to a digital television, and the second application may be an application in relation to a mobile device.

According to a modification of the first embodiment, conversely, the first application may be an application in relation to a mobile device, and the second application may be an application in relation to a digital television.

Also, according to the first embodiment of the present invention, the displaying of the list of the external devices on the screen of the display apparatus may include: searching for external devices for executing the second application included in the first application; making a list of information regarding the searched external devices to generate a list of the external devices; and displaying the list of the eternal device on the screen of the display apparatus.

Also, according to the first embodiment of the present invention, the second application may be a Web application, and the selected external device may include a platform application able to drive a Web application.

Here, the selected external device may install the second application in the platform application.

Also, according to the first embodiment of the present invention, the display apparatus may be a digital television, and the platform application may be a remote controller application performing a function of a remote controller with respect to the digital television.

Also, according to the first embodiment of the present invention, the transmitting of the second application may include: determining whether or not the platform application has been executed; and transmitting the second application to the selected external device when the platform application has been executed, and transmitting a control signal such that guide information in relation to execution of the platform application is provided by the selected external device when the platform application has not been executed.

Here, the guide information may be a pop-up menu displayed on the screen of the selected external device and checking whether or not the platform application has been executed, and the selected external device may execute the platform application based on a user selected input corresponding to the pop-up menu.

Also, according to the first embodiment of the present invention, the selected external device may be a plurality of external devices, and the transmitting of the second application may include: authenticating the respective selected external devices for a connection with the plurality of selected external devices; assigning an authentication number to the authentication-completed external devices; and transmitting the second application to the authentication-completed external devices according to the assigned authentication numbers.

Hereinafter, a case in which the display apparatus is a digital television (e.g., a smart TV), the external device is a mobile terminal (e.g., a smart phone), and the platform application is a remote controller application with respect to the digital television will be described in detail with reference to FIG. 6A.

In this case, the first application may be an application in relation to a digital television, and the second application may be an application in relation to a mobile device.

Also, the second application may be a Web application, and the selected external device may include a platform application that may be able to drive a Web application.

FIG. 6A is an exemplary view illustrating a process of searching an external device by the display apparatus according to a first embodiment of the present disclosure.

Referring to FIG. 6A, the display apparatus 300 may search for at least one external device that may be connected through a fixed line or wirelessly.

The method for searching for an external application by the display apparatus 300 will be described in detail. First, the display apparatus 300 may execute a first application.

The first application may be an application installed, executed, and operated in the display apparatus 300. For example, the first application may be an app (or application) for a TV.

Also, the first application may include the second application.

The second application may be an application installed, executed, and operated in the external device 400.

The first application may be downloaded to the display apparatus 300 through a server in relation to an app (or application) store.

To this end, the display apparatus 300 may access the server through a wired/wireless communication network, and may download the first application through a user interface UI in relation to the app store.

Thus, the display apparatus 300 may download only the first application including the second application from the server and provide (or transmit) the second application to the external device 400.

Thus, it is not necessary for the display apparatus 300 and the external device 400 to download the first application and the second application and install the same, separately, to perform inter-device interworking function, thus implementing a simple and effective inter-device interworking function.

The display apparatus 300 may search for at least one external device 400 that may be connected to the display apparatus 300 through a fixed line or wirelessly through particular communication equipment c110.

The particular communication equipment c110 may be a device connecting a plurality of equipment (or devices). For example, the particular communication equipment c110 may be a device in relation to providing access point (AP) or a wireless sharer.

Here, the external device 400 may be a device that may be able to execute the second application included in the first application.

Also, the external device 400 may include a remote platform application for inter-device interworking with the display apparatus 300.

For example, the remote platform application may be a remote controller application that may be able to control an operation of the display apparatus 300.

The platform application may be an application that may be able to drive a Web app. Thus, when the second application is a Web app, the external device 400 may install and execute the second application through the platform application irrespective of a type of a mobile platform (e.g., iOS, Android, or the like) provided in the external device 400. Namely, the inter-device interworking function independent upon a mobile platform may be provided through the platform application.

When the external device 400 is searched, the display apparatus 300 may generate make a list of information regarding the searched external devices 400 to generate a list L110 of the external devices 400.

Also, the display apparatus 300 may display the list L110 of the external devices 400 on the screen of the display apparatus 300.

For example, as illustrated in FIG. 6A, the list L110 may be "1. A001 2. A002 . . . ". Also, for example, 'A001' may refer to the external device 400.

Also, the display apparatus 300 may determine whether or not the external device 400 has executed the platform application.

In this case, when the platform application has been executed, the display apparatus 300 may transmit the second application to the selected external device, and when the platform application has not been executed, the display apparatus 300 may transmit a control signal such that guide information regarding as to whether or not the platform application has been executed is provided by the selected external device.

The display apparatus 300 may provide the guide information in various forms. For example, the guide information may be a pop-up menu displayed on the screen of the selected external device and checking whether to execute the platform application.

The external device 400 may provide the guide information (e.g., the pop-up menu) based on the control signal.

For example, like the case illustrated in FIG. 6A, the pop-up menu may be a pop-up window displaying a guide message such as 'Want to execute remote controller app? Yes, No".

In this case, the external device 400 may determine whether to execute the remote controller app based on a user selection input of the external device 400. For example, when the user answers 'Yes' in response to the guide message, the external device 400 may install the remote controller app.

FIG. 6B is an exemplary view illustrating an operation of connecting an external device according to a first embodiment of the present disclosure.

Referring to FIG. 6B, when the remote controller app has already been executed or when the at least one external device 400a, 400b has executed the remote controller app based on the user selection input, the display apparatus 300 may performs an authentication process on the at least one external device 400a, 400b.

As mentioned above, when the display apparatus 300 is a digital television, the authentication may refer to a TV authentication.

A purpose of the authentication is not to transmit confidential data or message to a unreliable mobile device (or a selected external device), because a first application (e.g., a Web application or a Web App) driven in the TV includes a second application (e.g., a mobile Web App).

The display apparatus 300 may assign a number to the at least one external device 400a, 400b in order in which authentication of the at least one external device 400a, 400b is completed.

For example, when authentication of the first external device 400a and the second external device 400b has been completed in order, the display apparatus 300 may assign No. 1 to the first external device 400a and No. 2 to the second external device 400b.

In this case, the display apparatus 300 may be connected to the at least one external device 400a, 400b according to order of the assigned numbers.

Here, the display apparatus 300 may display an indicator (e.g., in the case of FIG. 6, a guide message such as "authenticate and connect") indicating information that authentication and connection operation are being performed with the external devices 400a, 400b on the screen of the display apparatus 300.

FIG. 6C is an exemplary view illustrating an operation of installing an application according to the first embodiment of the present disclosure.

Referring to FIG. 6C, the display apparatus 300 may transmit the second application included in the first application to the at least one connected external device 400a, 400b.

In this case, the at least one external device 400a, 400b may install the transmitted second application. Here, the at least one external device 400a, 400b may display an indicator indicating an installation process of the second application on the screen of the selected external device.

For example, as illustrated in FIG. 6C, the indicator may include progress bars 1110 and 1120 indicating a progress state in installing the second application.

Here, the display apparatus 300 may display an indicator (e.g., a guide message such as "install" in case of FIG. 6C) indicating information that the second application is being installed in the external device 400a, 400b on the screen.

Figure 6D:
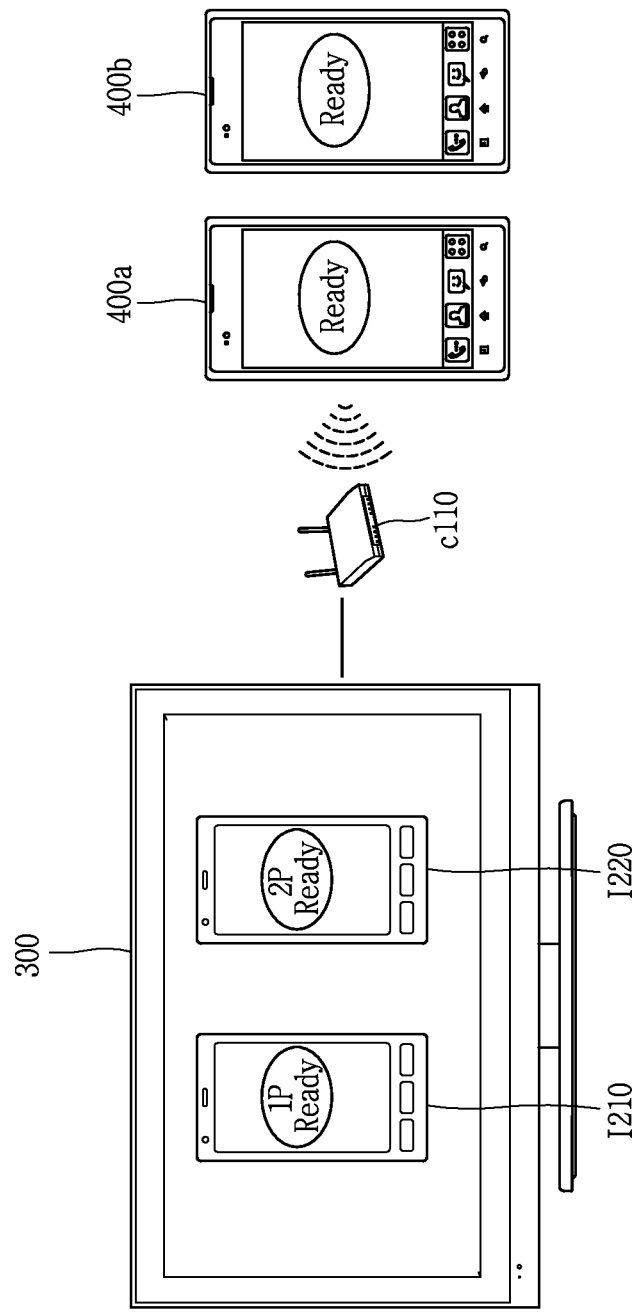
FIG. 6D is an exemplary view illustrating preparation of an inter-device interworking function according to the first embodiment of the present disclosure.

FIG. 6D is an exemplary view illustrating preparation of an inter-device interworking function according to the first embodiment of the present disclosure.

Referring to FIG. 6D, when the installation of the second application in the external device 400a, 400b is completed so a setting in relation to an inter-device interworking function (e.g., a multi-user game function) through the first application and the second application has been completed, the display apparatus 300 may display an indicator indicating that the at least one external device 400a, 400b is ready on the screen of the display apparatus 300.

For example, as shown in the left of FIG. 6D, the indicator indicating that the at least one external device 400a, 400b is ready may be an indicator (shapes of mobile terminals corresponding to 1P and 2P) indicating an outer appearance of the at least one external device 400a, 400b.

Also, the at least one external device 400a, 400b may also display an indicator indicating a state of being ready for an inter-device interworking function on the screen of the at least one external device 400a, 400b.

For example, as shown in the right of FIG. 6D, the indicator indicating the state of being ready for an inter-device interworking function may be an indicator having an oval shape including "READY" as an English expression indicating a state of being ready.

Figure 7:
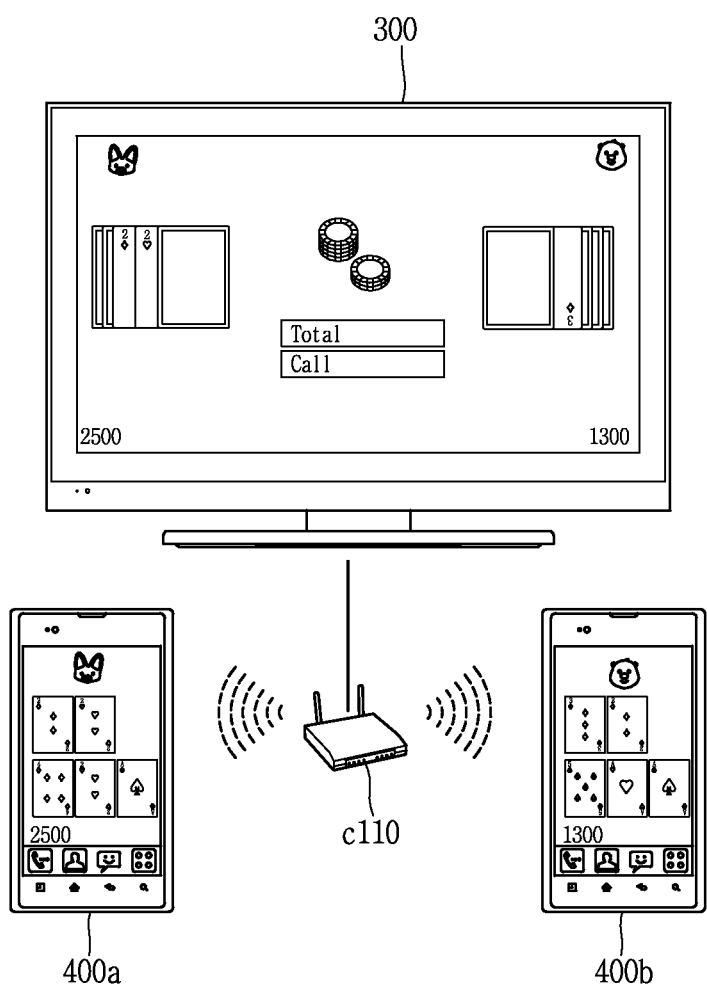
FIG. 7 is an exemplary view illustrating a device interworking function using a remote platform application according to the first embodiment of the present disclosure.

FIG. 7 is an exemplary view illustrating a device interworking function using a remote platform application according to the first embodiment of the present disclosure.

FIG. 7 shows a case in which the display apparatus 300 is a digital television (e.g., a smart TV) and the external device 400a, 400b is a mobile terminal (e.g., a smart phone). Thus, the first application may be a TV application, and the second application is a mobile app.

Referring to FIG. 7, when the first application has been execute by the display apparatus 300 and the second application has been transmitted to the external device 400a, 400b by the display apparatus 300 and installed and executed therein, an inter-device interworking function may be performed between the display apparatus 300 and the external device 400a, 400b.

Here, the second application may be a Web application operating irrespective of a type of a mobile platform provided in the external device 400a, 400b.

For example, like the case of FIG. 7, when a plurality of users want to execute a multi-user card game through the inter-device interworking function, the display apparatus 300 may execute a TV card game application as the first application, and transmit a mobile card game application as the second application included in the first application to the external device 400a, 400b through the application executing method according to the first embodiment of the present invention as described above.

Also, the external device 400a, 400b may install the transmitted mobile card game application as the second application in the remote controller application as a platform application it already has.

Also, the users of the first external device 400a and the second external device 400b may execute the mobile card game application, respectively.

In this case, the display apparatus 300 may be connected to the first external device 400a and the second external device 400b through a fixed line or wirelessly, and the display apparatus 300 and the external devices 400a and 400b may interwork to operate on the card game through the first application, the second application, and the remote controller application as the platform application for driving a Web app.

At this time, the TV application and the mobile application may be driven through interworking by exchanging data or message.

Also, the mobile application may access a mobile device such as an acceleration sensor, an audio device, and the like, through the installed (or provided) platform application to use the same.

Second Embodiment

Indicator Indicating Inter-Device Interworking Function Through Platform App

The second embodiment disclosed in the present disclosure may be implemented with a portion or a combination of the components or steps included in the foregoing embodiments or may be implemented with a combination of the foregoing embodiments. Hereinafter, overlapping portions may be omitted for clarity of the second embodiment disclosed in the present disclosure.

The second embodiment disclosed in the present disclosure relates to a method for displaying an indicator indicating an inter-device interworking function through a platform application that may be able to drive a Web application.

According to the second embodiment disclosed in the present disclosure, a method of executing an application of a display apparatus includes executing a first application, displaying a list of external devices able to execute a second application included in the first application, on a screen of the display apparatus, and transmitting the second application to an external device selected from the list of eternal devices, wherein the first application is downloaded from the server to the display apparatus.

The second embodiment of the present invention relates to a method for displaying an indicator indicating information that the first application includes the second application.

Namely, the second embodiment of the present invention relates to a function of allowing the first application to be easily and conveniently downloaded by displaying an indicator indicating information that the first application includes the second application providing an inter-device interworking function through a platform application that is able to drive a Web application, when the display apparatus intents to download the first application through a server.

In detail, according to the second embodiment of the present invention, the server may provide a user interface (UI) supporting downloading of the first application to the display apparatus, and the display apparatus may display a screen in relation to the UI and display an indicator indicating information that the first application includes the second application on the screen in relation to the UI.

Also, according to the second embodiment of the present invention, the display apparatus may display an indicator indicating information that the first application includes the second application, on the screen.

Also, according to the second embodiment of the present invention, the display apparatus may display an icon in relation to execution of the first application on the screen, and display the indicator on the icon.

Figure 8A:
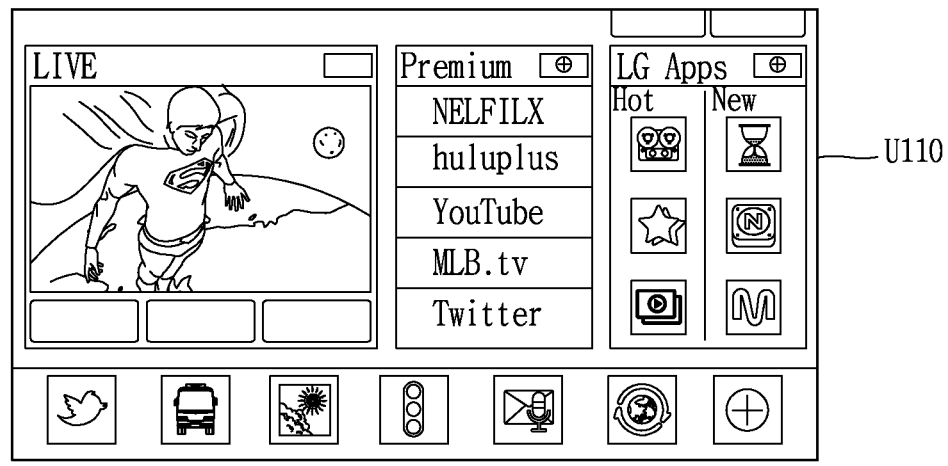
FIGS. 8A-8C are exemplary views illustrating a method of displaying an indicator according to a second embodiment of the present disclosure.
Figure 8B:
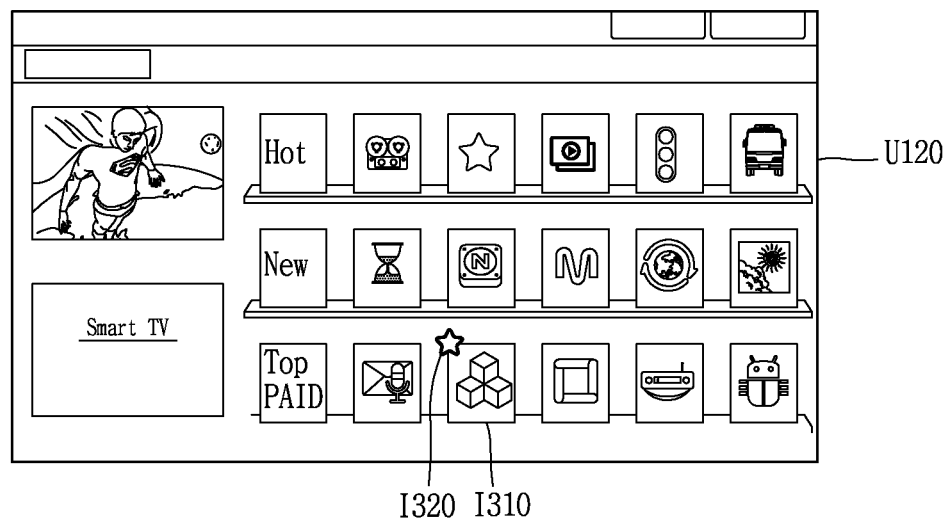
Figure 8C:
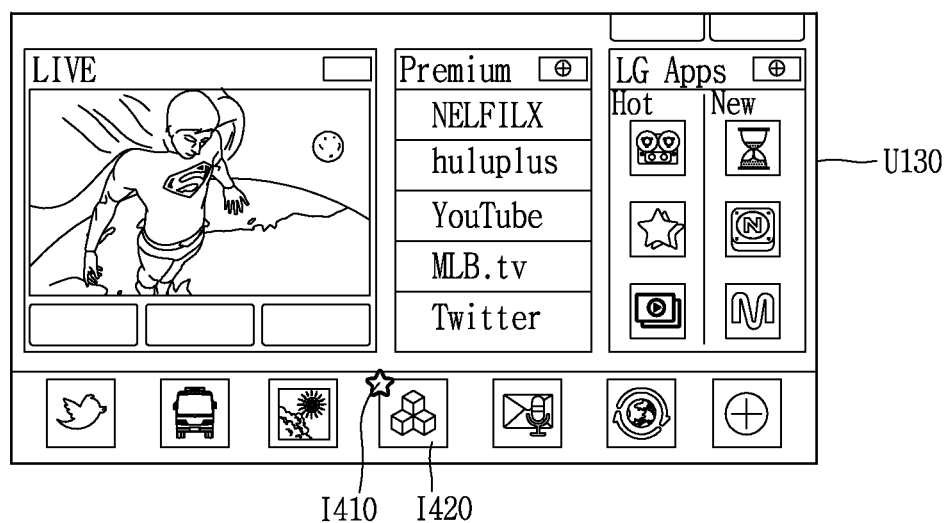

FIGS. 8A-8C are exemplary views illustrating a method of displaying an indicator according to a second embodiment of the present disclosure.

FIG. 8A illustrates a state before the display apparatus 300 downloads the second application from the server.

The display apparatus 300 may display information in relation to a basically provided application and a screen U110 in relation to an operation of the display apparatus 300.

Referring to FIG. 8A, the display apparatus 300 may display icons installed to be executable in the display apparatus 300 in a lower portion of the UI screen U110.

FIG. 8B shows a UI screen U120 in relation to an app store provided through the server.

Referring to FIG. 8B, the server may provide a UI supporting downloading of the first application to the display apparatus 300.

Also, the display apparatus 300 may display a screen in relation to the UI based on the provided UI.

For example, the display apparatus 300 may support or provide the UI screen U120 of the application store supporting downloading of various applications through the server, in the form as shown in FIG. 8B.

In this case, the display apparatus 300 may display an indicator indicating information that the first application includes the second application on the screen of the display apparatus 300.

For example, as shown in FIG. 8B, the display apparatus 300 may display an icon 1310 indicating the first application on the screen.

Also, the display apparatus 300 may display an indicator 1320 (indicated by a star) indicating information that the first application includes the second application as a Web application driven in a platform application provided in a mobile device, together on the icon.

Thus, the user of the display apparatus 300 may easily discriminate the first application from the other downloadable applications, and download the same.

FIG. 8C illustrates a UI screen U130 in relation to the display apparatus 300 after the first application is installed in the display apparatus 300.

Also FIG. 8C illustrates a screen similar to the UI screen U110 illustrated in FIG. 8A, but it illustrates a screen in which the first application is further installed.

Referring to FIG. 8C, the display apparatus 300 may display an icon 1420 indicating the first application on the screen of the display apparatus 300.

Also, the display apparatus 300 may display an indicator 1410 (indicated by a star) indicating information that the first application includes the second application as a Web application driven in the platform application provided in the mobile device, together on the icon.

Thus, the user of the display apparatus 300 may easily discriminate the first application from the other downloadable applications, and execute the same.

As described above, according to the embodiments disclosed in the present disclosure, the display apparatus downloads an application in which a TV app and a remote app are packaged together (or an application implemented in a single app form) from a particular server and installs the same, whereby when the display apparatus executes the TV app, a mobile app may be transmitted from the display apparatus (e.g., a TV0 to a remote device (or an external device, a mobile device, etc.) and installed therein.

In this case, the mobile device may include a platform for driving a Web app, rather than a simple XML UI generator.

Also, the user of the display apparatus or the remote device may install only the TV app, and when the TV app is executed, the mobile app is automatically executed. Thus, a user UX (user eXperience) of the necessity of installing and executing the TV app and the mobile app, separately, and cooperatively operating them may be improved.

Also, a TV app developer may develop the TV app and the mobile app and package them, so the mobile app is not required to be separately distributed, and malfunction such as a version issue between the mobile app and the TV app, the like, may be eliminated.

Also, an excellent mobile app, relative to the existing XML UI generation scheme, can be developed.

Also, the mobile app is a Web app generated in a Web language (HTML, JavaScript), and since the mobile app is generated in a Web language, it is not dependent upon a mobile platform (iOS, Android, etc).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of executing an application of a display apparatus, the method comprising:
    executing a first application;
    displaying a list of external devices able to execute a second application included in the first application, on a screen of the display apparatus in a state where the first application is executed;
    determining whether or not a platform application has been executed in an external device selected from the list of external devices, wherein the selected external device includes the platform application able to drive the second application;
    transmitting the second application to the selected external device when the platform application has been executed in the external device; and
    transmitting a control signal such that guide information in relation to execution of the platform application is provided by the selected external device when the platform application has not been executed in the external device,
    wherein the first application is downloaded from a server to the display apparatus.

2. The method of claim 1, wherein the first application is an application in relation to a digital television, and the second application is an application in relation to a mobile device.

3. The method of claim 1, wherein the displaying of the list of the external devices on the screen of the display apparatus comprises:
    searching for external devices for executing the second application included in the first application; making a list of information regarding the searched external devices to generate a list of the external devices; and
    displaying the list of the external device on the screen of the display apparatus.

4. The method of claim 1, wherein the selected external device installs the second application in the platform application.

5. The method of claim 4, wherein the selected external device displays an indicator indicating an installation process of the second application on a screen thereof.

6. The method of claim 1, wherein the display apparatus is a digital television, and the platform application is a remote controller application performing a function of a remote controller with respect to the digital television.

7. The method of claim 1, wherein the guide information is a pop-up menu displayed on the screen of the selected external device and checking whether or not the platform application has been executed, and
    the selected external device executes the platform application based on a user selected input corresponding to the pop-up menu.

8. The method of claim 1, wherein the selected external device is a plurality of external devices, and
    the transmitting of the second application comprises:
    authenticating the respective selected external devices for a connection with the plurality of selected external devices;
    assigning an authentication number to the authentication-completed external devices; and
    transmitting the second application to the authentication-completed external devices according to the assigned authentication numbers.

9. The method of claim 1, wherein the server provides a user interface supporting downloading of the first application to the display apparatus,
    the display apparatus displays a screen in relation to the UI, and
    an indicator indicating information that the first application includes the second application on the screen in relation to the UI.

10. The method of claim 1, wherein the display apparatus displays an indicator indicating information that the first application includes the second application, on the screen.

11. The method of claim 10, wherein the display apparatus displays an icon in relation to execution of the first application on the screen, and displays the indicator on the icon.

12. A method for installing an application of a device including a platform application able to drive a Web application, the method comprising:
    connecting the device to a display apparatus in which a first application is executed through a fixed line or wirelessly;
    determining whether or not the platform application has been executed in the device;

receiving a second application included in the first application from the display apparatus when the platform application has been executed, wherein the second application is installed in the platform application; and displaying guide information in relation to execution of the platform application when the platform application has not been executed in the external device, wherein the first application and the second application are Web applications, and the first application is downloaded from a server to the display apparatus.

13. A display apparatus for executing an application, the display apparatus comprising:
   a display unit configured to display an image in relation to a first application on a screen;
   a communication unit configured to transmit and receive data in relation to the first application; and
   a controller configured to execute the first application,
   control the display unit to display a list of external devices able to execute a second application included in the first application on the screen in a state where the first application is executed;
   determine whether or not a platform application has been executed in an external device selected from the list of external devices, wherein the selected external device includes the platform application to drive the second application;
   control the communication unit to transmit the second application to the selected external device when the platform application has been executed in the external device; and
   control the communication unit to transmit a control signal such that guide information in relation to execution of the platform application is provided by the selected external device when the platform application has not been executed in the external device,
   wherein the first application is downloaded from a server.

14. The display apparatus of claim 13, wherein the controller controls the display unit to display information in relation to the first application on the screen.

15. The display apparatus of claim 14, wherein the information in relation to the first application is information indicating that the first application includes the second application.

16. The display apparatus of claim 13, wherein the controller displays an icon in relation to execution of the first application on the screen, and controls the display unit to display an indicator indicating information that the first application includes the second application on the icon displayed on the screen.

17. The display apparatus of claim 13, wherein the external device executes the second application such that the external device interworks with the display apparatus.

18. The method of claim 1, wherein the selected external device executes the second application such that the selected external device interworks with the display apparatus.

* * * * *